No. 664,524. Patented Dec. 25, 1900.
J. R. BEEMAN & F. H. SCHMIDT.
AUTOMATIC STOCK WATERING FOUNTAIN.
(Application filed Sept. 27, 1900.)
(No Model.)
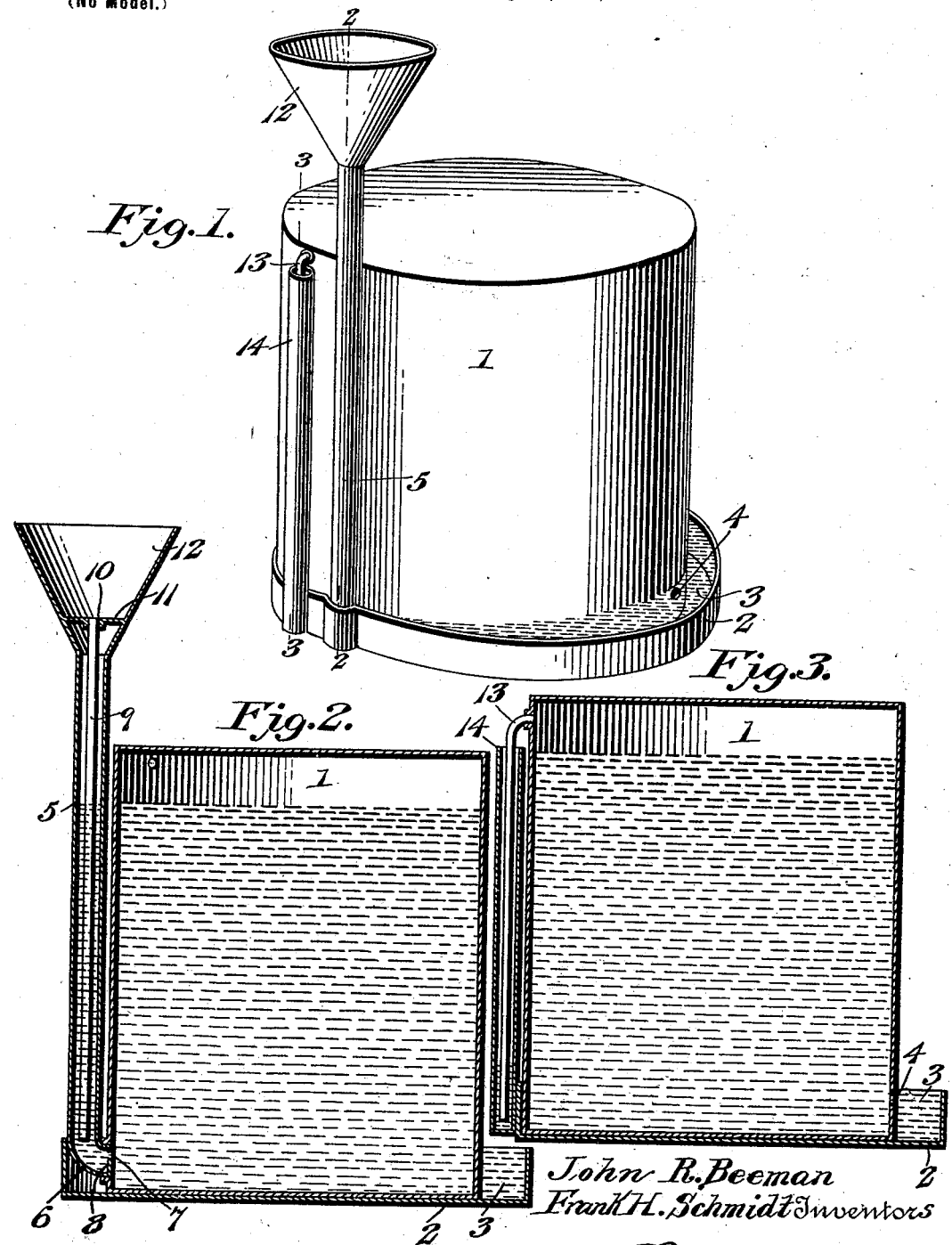
Witnesses
Edwin McKee
D. P. ...
John R. Beeman
Frank H. Schmidt Inventors
By
E. G. Siggers
Attorney

UNITED STATES PATENT OFFICE.

JOHN R. BEEMAN AND FRANK H. SCHMIDT, OF GEORGE, IOWA.

AUTOMATIC STOCK-WATERING FOUNTAIN.

SPECIFICATION forming part of Letters Patent No. 664,524, dated December 25, 1900.

Application filed September 27, 1900. Serial No. 31,316. (No model.)

*To all whom it may concern:*

Be it known that we, JOHN R. BEEMAN and FRANK H. SCHMIDT, citizens of the United States, residing at George, in the county of Lyon and State of Iowa, have invented a new and useful Automatic Stock-Watering Fountain, of which the following is a specification.

This invention relates to stock-watering apparatus or fountains; and it has for one object to provide a simple and reliable apparatus of this character comprising automatic means for supplying water to a trough for all kinds of stock, as well as fowls, and automatically maintaining the water at a substantially uniform level in the drinking-trough at all times.

To this end the invention contemplates a construction of fountain in which there is an entire absence of valves, floats, and other movable elements, while at the same time provision is made for the positive automatic flowing of the water into the drinking-trough as the same may be depleted by the stock or fowls.

A further object of the invention is for venting the tank during the filling, while at the same time providing novel means for resupplying or filling the tank with water without such an agitation of the body thereof as to tend to cause an overflow of the drinking-trough.

With these and other objects in view, which will more readily appear as the nature of the invention is better understood, the same consists in the novel construction and arrangements of parts, as hereinafter more fully described, illustrated, and claimed.

The preferred embodiment of the improvements is shown in the accompanying drawings, in which—

Figure 1 is a perspective view of a stock-watering fountain constructed in accordance with the present invention. Fig. 2 is a vertical sectional view on the line 2 2 of Fig. 1, the line of section including the filling device. Fig. 3 is a similar view on the line 3 3 of Fig. 1, the line of section including the air-vent device.

Like numerals of reference designate corresponding parts in all the figures of the drawings.

In carrying out the invention there is employed a main reservoir-tank 1, which is of any suitable size and shape and is made perfectly air-tight in order that the exterior atmospheric pressure may be utilized to provide for sustaining the body of water within the tank under normal conditions. The said tank is arranged to be seated within an open-top basin or pan 2, which has the rim thereof offset sufficiently from the tank to provide an annular drinking-trough 3, which freely exposes the water therein to the stock or fowls desiring to drink. The said tank and basin or pan 2 are preferably separate and independent parts to facilitate the cleaning and repairing thereof, and the water within the drinking-trough is replenished from time to time through the outlet-port 4, formed in the wall of the tank 1 contiguous to the bottom thereof and below the plane of the top edge of the drinking-trough 3, so that the water within said trough can cover and seal the said port without overflowing from the trough.

To provide for filling the reservoir or tank, there is associated with the same a filling device, including an exterior conducting-tube 5, preferably arranged in an upright position alongside of the tank and having an elbow connection 6 at its lower end with one side of the tank contiguous to the lower end thereof. Said elbow connection of the exterior conducting-tube 5 of the filling device is in communication with the lateral feed-port 7, formed in the wall of the tank, and at this point it will be observed that said lateral feed-port 7 has extended transversely across the same a baffle-lip 8, which preferably rises from the lower side of the elbow 6 at the point where it connects with the fountain-wall and is therefore disposed in such a position as to receive the impact of the water fed into the elbow connection 6 through the interior filling-pipe 9. The said baffle-lip 8 also serves to contract the orifice or passage-way through the port 7 to such an extent that a quiet flow of water into the tank is insured.

The interior filling-pipe 9 is of a smaller size than the conducting-tube 5, housing the same, and terminates at its lower end at or within the elbow connection 6, the upper end of said interior pipe 9 being fitted in the central pipe-opening 10, formed in the imperforate bottom plate 11, fitted within the lower end portion of the filling-funnel 12, surmounting the upper end of the exterior conducting-tube 5.

To provide for the venting of the air from the tank during the filling thereof, there is employed an air-vent device comprising a vent-pipe 13 and an escape-tube 14. The vent-pipe 13 is connected at its upper end with the reservoir-tank, so as to communicate with the interior thereof above the body of the water therein, and said pipe 13 extends downwardly within the escape-tube 14, which is arranged on the exterior of the reservoir-tank and is provided with an open upper end to permit of the free venting of the air. The lower closed end portion of the escape-tube is designed to receive a quantity of water into which the lower end of the pipe 13 extends, so as to make a water-seal connection therefor, which prevents air from passing through the pipe into the tank, while at the same time freely permitting the escape or venting of the air which is displaced by the body of water as the same flows into the tank.

In the use of the fountain it is understood that with the drinking-trough filled and the outlet-port 4 covered with water there is an equilibrium of pressure which prevents further flow of water from the tank until the supply in the trough has been depleted to a point below the port 4, thereby uncovering said port and permitting the resupplying or replenishing of the trough.

During the filling operation the water passes through the interior filling-pipe 9 and is distributed into the elbow connection 6. By reason of the upstanding baffle-plate 8 and the contracted port 7 the water is compelled to flow quietly into the tank, and thus prevents agitation of the body of water during the filling of the tank, which agitation would tend to force water out of the outlet-port 4 and overflow the drinking-trough. It will of course be understood that during the filling operation the outlet-port is temporarily corked; but when the cork or stopper is removed if the body of liquid within the tank is unduly agitated or in motion the result stated is liable to occur.

From the foregoing it is thought that the construction, operation, and many advantages of the herein-described fountain will be readily apparent to those skilled in the art without further description, and it will be understood that various changes in the size, shape, proportion, and minor details of construction may be resorted to without departing from the spirit or sacrificing any of the advantages of the invention.

Having thus described our invention, what we claim as new, and desire to secure by Letters Patent, is—

1. In a stock-watering fountain, the combination with the reservoir-tank, and the drinking-trough associated therewith, of a filling device comprising an outer tube connected at one end with the tank, at or contiguous to the lower end of the latter, and a smaller interior filling-pipe, arranged within and spaced from the wall of said outer tube, said filling-pipe terminating at its lower end contiguous to the connection of the outer tube with the tank, and adapted to be sealed within the liquid in said tube.

2. In a stock-watering fountain, the combination with a reservoir or tank and a drinking-trough associated therewith, of an upright conducting-tube provided at its upper end with a filling-funnel and having an elbow connection at its lower end with the tank contiguous to the bottom of the latter, a baffle-lip arranged to obstruct the passage of water from the elbow connection into the tank, an imperforate bottom within the filling-funnel, and an interior filling-pipe suspended from said bottom and having its lower end terminating at or within said elbow connection.

3. In a stock-watering fountain, the combination with the drinking-trough, and the reservoir having an outlet opening into said trough, of a filling device for the tank, and a separate air-vent device comprising an escape-tube open at the top and adapted to contain a liquid seal at the bottom, and a vent-pipe extending longitudinally within said tube into the liquid seal thereof, and connected at one end with the top portion of the reservoir, said vent-pipe being independent of the outlet from the reservoir into the trough, substantially as set forth.

In testimony that we claim the foregoing as our own we have hereto affixed our signatures in the presence of two witnesses.

JOHN R. BEEMAN.
FRANK H. SCHMIDT.

Witnesses:
E. A. BEEMAN,
C. H. MILLER.